Dec. 8, 1953  P. JOHNSON  2,661,723
PRESSURE FLUID, FOLLOW-UP TYPE SERVOMOTOR
Filed Jan. 27, 1951
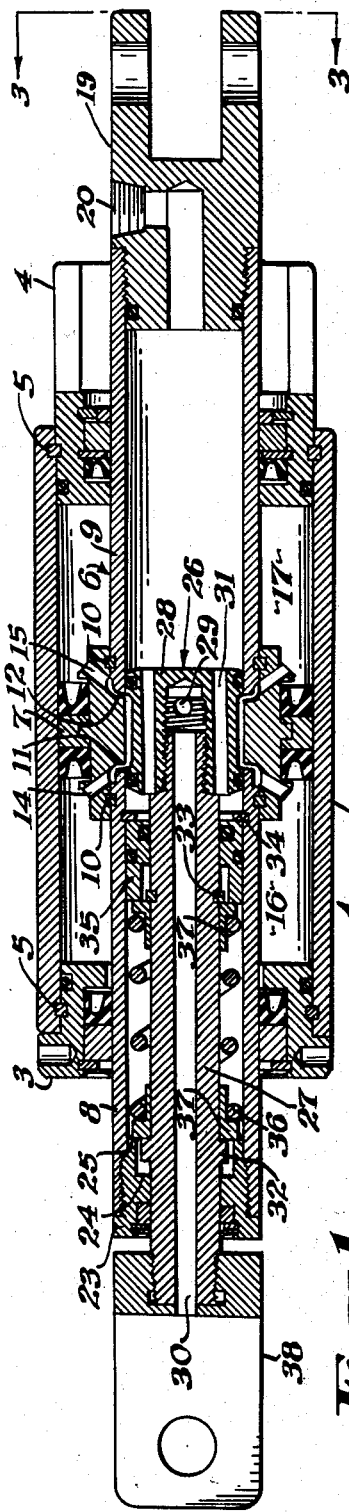
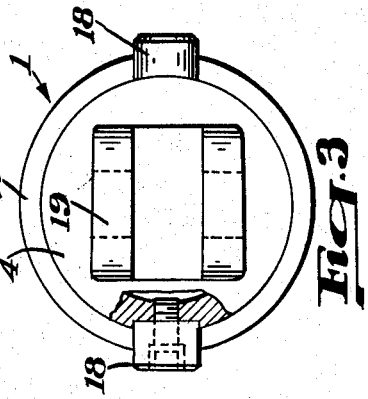
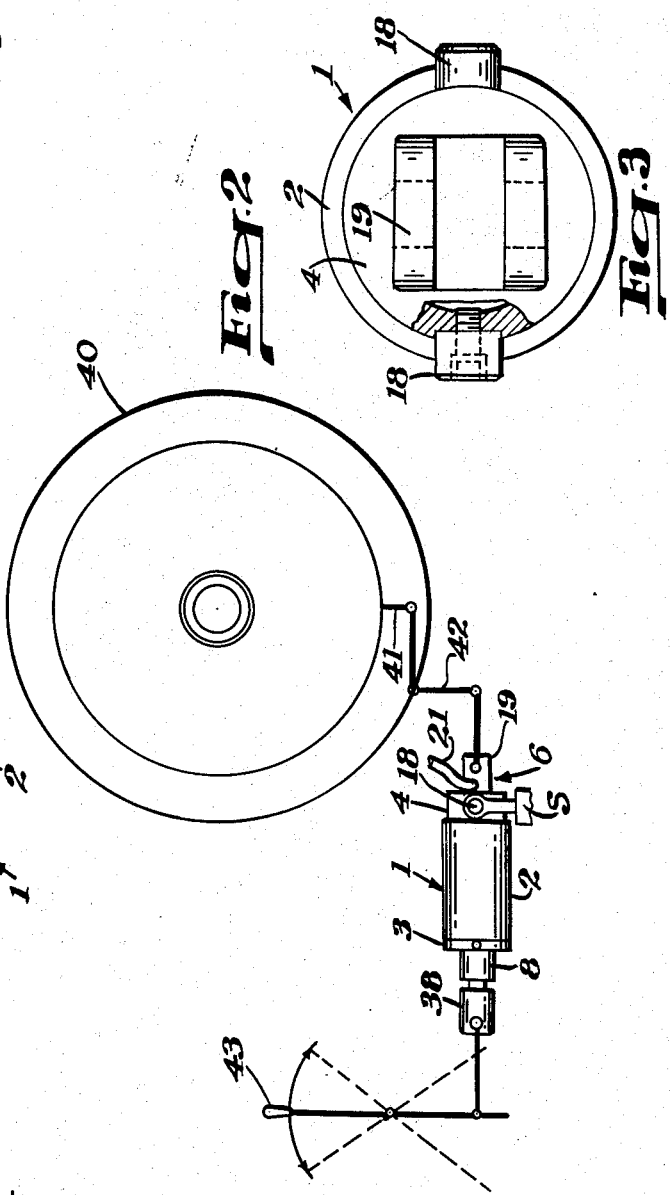
INVENTOR.
PAUL JOHNSON.
BY Oberlin E Limbach
ATTORNEYS Patented Dec. 8, 1953

2,661,723

UNITED STATES PATENT OFFICE 2,661,723

PRESSURE FLUID, FOLLOW-UP TYPE SERVOMOTOR

Paul Johnson, Elyria, Ohio, assignor to The Thew Shovel Company, Lorain, Ohio, a corporation of Ohio Application January 27, 1951, Serial No. 208,120

7 Claims. (Cl. 121—41)

The present invention relates generally as indicated to a control device or pressure fluid, follow-up type servomotor and more particularly to a control device through which actuation of a mechanism connected thereto may be effected manually with or without a power supplement dependent upon the force required to actuate the mechanism.

Accordingly, the present control device is especially suited for actuation of clutch or brake mechanisms, for example, such as are used in hoisting machinery, power shovels, cranes and the like wherein it is desired to effect manual "inching" movement of the actuating member for such mechanisms so as to provide a direct "feel" to the operator, and to effect full force movement of said member to engage and disengage the clutch mechanism or to set the brake mechanism but without corresponding increase in the effort required on the part of the operator to so move the actuating member.

In its broader aspects the present control device also has utility in connection with any member which it is desired to manually shift in one direction or in opposite directions wth the assistance of power means to ease the task of manual shifting.

It is therefore one main object of the present invention to provide a control device which meets the aforesaid requirements of a manual control either supplemented or not by a power means according to the forces required.

Another object is to provide a control device as aforesaid adapted for installation in interposed relation between the manual operator lever and the movable actuating member of the mechanism to be controlled.

Another object is to provide a control device having a hydraulic power booster therein requiring only connection thereof with a source of fluid under pressure.

Other objects include the provision of a compact, self-contained control device which is of a form economical to manufacture and foolproof in operation and which includes a piston and cylinder assembly with a shiftable valve member therein through which direct actuation of the piston is effected and through the shifting of which, by application of increased force thereon, fluid under pressure is admitted into the cylinder to supplement the manual force on the valve member in the effecting of continued movement of the piston.

Other objects and advantages will become apparent as the following description proceeds.

To the accomplishment of the foregoing and related ends, said invention, then, comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

In said annexed drawing:

Fig. 1 is a longitudinal cross-section view of one form of control device;

Fig. 2 is a diagrammatic view of a typical installation of said control device; and Fig. 3 is an end elevation view as viewed along the line 3—3, Fig. 1.

Referring now more particularly to the drawing and first to Figs. 1 and 3, the control device comprises a hydraulic cylinder 1 which includes a tubular body 2 and the usual heads 3 and 4 secured to said body at opposite ends as by means of retaining rings 5 engaged in peripheral, opposed grooves in the telescoped portions of said heads and said body, said rings each preferably comprising a piece of wire inserted through an opening in the wall of the body which is tangent to the opposed grooves. This manner of securing said heads and body together is to be regarded as merely exemplary and obviously said heads may be threaded, bolted, or otherwise secured in place at the opposite ends of said body.

Reciprocable within said cylinder 1 is a piston unit 6 which includes an intermediate piston 7 and oppositely extending tubular rod portions 8 and 9 slidably extending through the respective heads 3 and 4 and secured to said piston 7 as by means of retaining rings 10. The inner ends of said rod portions 8 and 9 define with said piston 7 two axially spaced relatively narrow gaps 11 and 12, and said piston is formed with passages 14 and 15 leading from the respective gaps to the annular chambers 16 and 17 on opposite sides of said piston.

Said head 4 has secured thereto on diametrically opposite sides, cylindrical members 18 through which the cylinder 1 may be pivotally mounted on a suitable fixed support S as shown in Fig. 2.

A yoke 19 is threaded into the outer end of rod portion 9 and is adapted for connection with the movable actuating member of a mechanism which it is desired to control through the shifting of said actuating member in opposite directions. Said yoke member 19 has an inlet port 20 which leads into rod portion 9 and to which a suitable flexible hose 21 (see Fig. 2) from a source of fluid under pressure is adapted to be connected.

The outer end of the tubular rod portion 8 has screwed thereinto a guide ring 23 providing two stop shoulders 24 and 25 for the valve assembly, now to be described, which controls selective admission of fluid under pressure into the chambers 16 and 17 from within the piston unit 6.

Said valve assembly comprises a valve member 26 including a rod 27 slidably extending through said guide ring 23 and a head or spool 28 secured to the inner end of said rod and slidably fitted in said piston unit 6, said spool 28 being formed with a peripheral groove between its ends adapted, when said spool is in the neutral position shown in Fig. 1, to communicate both of the chambers 16 and 17 to exhaust through the lateral opening 29 and passage 30 extending through rod 27. Of course, when the fluid under pressure is a liquid, the outer end of passage 30 will be connected to a sump or reservoir. The spool 28 is further formed with a passage 31 therethrough through which and gap 11 and passage 14 fluid flows into chamber 16 when said valve member 26 is shifted toward the right with respect to the piston unit 6, the other chamber 17 then being connected to exhaust by way of passages 15 and gap 12 and the aforesaid recess around said spool 28. Conversely, fluid is admitted into chamber 17 through gap 12 and passages 15 and exhausted from chamber 16 through passages 14 and gap 11 upon shifting of said valve member 26 toward the left from neutral position.

Accordingly, said shiftable valve member 26 and said piston unit 6 together define a four-way valve which in two positions alternately communicate the two chambers 16 and 17 with a source of fluid under pressure and an exhaust to effect actuation of the piston unit 6 in opposite directions and which in a third or neutral position blocks admission of fluid to both of said chambers.

Said rod 27 is provided with axially spaced stop shoulders 32 and 33 thereon, the latter being provided as by means of a snap ring seated in a groove around said rod, and said tubular rod portion 8 has a stop shoulder 34, also provided by means of a snap ring, axially spaced from guide ring 23 and shoulder 33.

Slidably mounted in said tubular rod portion 8 and on said rod 27 for limited reciprocation as determined by the stop shoulders 33 and 34, is a ring member 35. Between said ring member 35 and guide ring 23 is a coil spring 36, the spring guides 37 therefor being slidable on rod 27 and adapted to engage the stop shoulders 25 and 32 and to engage the stop shoulder 33 and adjacent end of ring member 35 in the neutral position of the valve member 26.

The outer end of said rod 27 has screwed thereonto a yoke 38 adapted for connection with a suitable manual operating lever through which the actuating member adapted to be connected to yoke 19 is shifted in opposite directions.

As shown in the drawing suitable packing rings of rubber or rubber-like material such as the familiar O rings and the U-shaped radial cross-section rings are employed where necessary or desired in order to establish fluid-tight joints and sliding seals between the several components of the control device.

Having thus described in detail the construction of one embodiment of the present invention, the operation thereof will now be described. Because the operation will vary according to the degree of compression of the coil spring 36 with respect to the fluid pressure and the areas of the ring member 35 and rod 27 on which such fluid acts tending to shift the same in a left-hand direction, the operation will be first described under conditions where the force exerted by the spring will maintain said ring member 35 engaged with shoulder 34 and valve member 26 in neutral position in opposition to fluid under pressure tending to shift said members 35 and 26 toward the left.

A typical installation of the present control device is shown diagrammatically in Fig. 2, the numeral 40 denoting the mechanism whose actuation it is desired to control through shifting of the actuating member 41 thereof in opposite directions, the numeral 42 denoting any suitable linkage interconnecting said member 41 with the yoke 19 at one end of the piston unit 6, and the numeral 43 denoting a common form of oscillatory manual control lever and link mechanism operatively secured to yoke 38 at the other end of the control device.

As is now evident, the manual swinging of lever 43 in a counterclockwise direction from the solid line position will shift the valve member 26 toward the right and so long as the resistance of the linkage 42 and actuating member 41 to right-hand movement of the piston unit 6 is less than the force exerted by spring 36 on member 35 and shoulder 34, said piston unit 6 will move toward the right in unison with said valve member 26 whereby to provide a mechanical "feel" to the operator whereby proper "inching" or like relatively low pressure movement of the member 41 may be accomplished.

However, should such resistance suddenly increase or should the operator desire to effect full force actuation, he then continues the counterclockwise rotation of lever 43 thereby compressing spring 36 to move valve member 26 toward the right with respect to piston unit 6, such relative shifting being arrested by engagement of shoulder 33 with the ring member 35. In such shifted position of said valve member 26, fluid under pressure flows through passages 31, gap 11, and passage 14 into chamber 16 whereby the piston unit 6 is urged toward the right but now with a force many times greater than that applied manually through the lever 43. If necessary, increased force may be applied on the lever 43, such increased force being transmitted positively to the piston unit 6 by reason of engagement of ring member 35 between stop shoulders 33 and 34. In this shifted position of valve member 26, chamber 17 is connected to exhaust in the manner previously explained.

After the mechanism 40 has been so actuated under full force, the operator may release pressure on the lever 43 whereby spring 36 will restore valve member 26 to neutral position.

On the return clockwise stroke of lever 43, the valve member 26 will be shifted to the left and again so long as the resistance of the linkage 42 and member 41 to left-hand movement of the piston unit 6 is less than the force exerted through spring 36, said piston unit 6 will move to the left in unison with valve member 26 by reason of engagement of spring guide 37 with shoulder 25.

However, should the resistance to such left-hand movement of said piston unit 6 be greater than the force exerted by spring 36, then continued left-hand movement of valve member 26 will further compress spring 36 between shoulders 25 and 33, the valve member thus being shifted relative to piston unit 6 to a position permitting fluid under pressure to flow through gap 12, and passages 15 into chamber 17, the chamber 16 then being connected to exhaust, whereupon the movement of piston unit 6 toward the left continues at much increased force. Movement of valve member 26 toward the left with respect to piston unit 6 is limited by engagement of stop shoulders 24 and 32 and if extra force is required over and above that supplied by the fluid under pressure, the same may be applied on lever 43, the engagement of shoulders 24 and 32 providing a direct positive connection between valve member 26 and piston unit 6.

It is to be noted that because of the relatively narrow gaps 11 and 12 there is produced a throttling of the fluid to avoid shock application of the hydraulic booster effect.

The above description of the operation is applicable to a control device in which the coil spring 36 is initially compressed to a degree to hold the valve member 26 in neutral position. However, if the force exerted by said spring 36 is not that great, the valve member 26 will automatically be shifted by the fluid under pressure to the left-hand position upon release of the lever 43, in which position fluid is admitted into chamber 17. When it is desired to shift the piston unit 6 to the right, there will first be a lost motion movement of said valve member 26 and ring member 35 relative to piston unit 6 until member 35 engages shoulder 34 at which time said valve member will be in neutral position. Continued right-hand movement of said valve member 26 is then either in unison with piston unit 6 or relative thereto in accordance with the force required to shift piston unit 6 to the right.

With the last mentioned relationship of the compression of spring 36 to the fluid pressure and areas of members 35 and 27, the control device may be conveniently employed in a machine tool feed mechanism to cause feeding of a tool into the work upon operation of lever 43 in one direction and automatic return of the tool to starting position upon release of the lever 43. Feeding or return can, of course, be interrupted simply by stopping the lever 43, in which case, the valve element 26 shifts to neutral position.

Other modes of applying the principle of the invention may be employed, change being made as regards the details described, provided the features stated in any of the following claims, or the equivalent of such, be employed.

I therefore particularly point out and distinctly claim as my invention:

1. A control device comprising a cylinder, a piston reciprocable in said cylinder, means forming two passageways for fluid under pressure respectively leading into said cylinder on opposite sides of said piston and inlet and outlet ports for fluid communicating with such passageways whereby said piston may be actuated in opposite directions in accordance with which one of such passageways is open to such inlet port while the other passageway is open to such outlet port, a valve member in said device movable in opposite directions from a neutral position communicating both of such passageways with such outlet port to positions selectively communicating such passageways one with such inlet port and the other with such outlet port whereby said piston is actuated by fluid under pressure in a desired direction, and yieldable means between said valve member and said piston holding said valve member in such neutral position with predetermined force whereby said piston may be actuated in a desired direction through said valve member and said means, said means, upon application of force on said valve member in excess of such predetermined force, yielding to permit relative movement of said valve member to the selected position whereby actuation of said piston in a desired direction is augmented by fluid under pressure acting thereon, said valve member and a member reciprocable relative thereto both being exposed to fluid under pressure and bearing on said yieldable means whereby, in the event of the yielding of said means under the influence of said last-named member and upon release of force on said valve member, said valve member will be actuated by fluid under pressure to communicate the fluid under pressure to the opposite side of said piston.

2. The structure according to claim 1 further characterized in that said piston comprises opposite tubular extensions defining two annular chambers with said cylinder and having such two passageways through the wall thereof leading to the respective chambers, said valve member is in the form of a spool slidable in opposite directions in said piston, and said member which is reciprocable with respect to said valve member is in the form of a ring slidable in said piston and on said valve member.

3. The structure according to claim 2 further characterized in that one of said tubular extensions is formed with axially spaced opposed shoulders, said valve member is similarly formed with axially spaced opposed shoulders, said ring is reciprocable between positions engaging one shoulder of said one extension and one shoulder of said valve member, and said yieldable means comprises a coil spring which, in the neutral position of said valve member, has its opposite ends in engagement with the other shoulders of said extension and valve member and with such one shoulder of said valve member and the end of said ring remote from such one shoulder of said extension whereby said piston is actuated in unison with said valve member through said spring so long as the force applied on said valve member and piston is less than the force exerted by said spring.

4. A valve mechanism for controlling the actuation of a hydraulic cylinder and piston assemblage which has inlet and outlet ports for fluid under pressure leading thereinto, comprising a valve member reciprocable in said piston to positions selectively closing and opening communication between such inlet port and said cylinder, and yieldable means opposing reciprocation of said valve member and yieldably holding said valve member in the first-mentioned position with predetermined force for actuation of said piston in unison with said valve member until the forces exerted on said piston and valve member exceed such predetermined force, whereupon said valve member is shifted to such second-mentioned position to cause fluid under pressure to augment continued actuation of said piston, said valve member and a member reciprocable relative thereto both being exposed to fluid under pressure and bearing on said yieldable means whereby, upon yielding of said yieldable means under the influence of said last-named member and release of said valve member, said valve member will be moved by fluid under pressure in the opposite direction.

5. A control device for the actuation of a movable part of a machine or the like comprising a longitudinally movable force-applying unit adapted to be connected at one end to such movable part and to be moved by exertion of manual effort at the other end in proportion to the force to be applied on such movable part, resilient means through which the manual effort exerted on such other end is transmitted to such one end, a reversible power device energized in one direction by predetermined yielding of said resilient means by exertion of manual effort on such other end of magnitude to effect such predetermined yielding and effective when thus energized to multiply the force applied through said unit on such movable part, a member movable with respect to such other end of said unit and also bearing on said resilient means, and means acting on said last-named member and on such other end of said unit effective to cause a further yielding of said resilient means and movement of said last-named member relative to such other end of said unit whereby, upon release of the manual effort on such other end, such other end is movable under the influence of said means to a position effecting reverse energization of said power device for application of such multiplied force on such movable part in the opposite direction.

6. The control device of claim 5 wherein said power device comprises a fluid pressure actuated motor of which such one end of said unit constitutes the movable element adapted to have fluid under pressure act alternately on opposite sides thereof, and such other end of said unit constitutes a control valve operative upon relative movement to such one end in opposite directions to communicate fluid under pressure to act alternately on opposite sides of said movable element, and wherein said means acting on said last-named member and such other end is fluid under pressure which effects such further yielding of said resilient means and movement of said last-named member for reversing of said power device upon release of manual effort on such other end.

7. A control device for the actuation of a movable part of a machine or the like comprising a longitudinally movable force-applying unit including a pair of aligned members respectively adapted for connection with such movable part and for exertion of manual effort thereon, a resilient member predeterminately opposing relative longitudinal movement between said pair of members, a fluid pressure actuated motor of which the member adapted for connection with such movable part constitutes the movable element, said motor having a passageway for fluid under pressure leading thereinto to act on said movable element, the other of said pair of aligned members constituting a valve closing and opening such passageway in accordance with the manual effort exerted on said other member being less than and greater than the opposing force exerted by said resilient member, said valve and a member movable relative thereto being both exposed to fluid under pressure and both bearing on said resilient member whereby, upon release of manual effort on said other member and yielding of said resilient member under the influence of said last-named member, said valve is rendered freely operable by fluid under pressure to a position for fluid pressure actuation of said motor in a reverse direction.

PAUL JOHNSON.

References Cited in the file of this patent

UNITED STATES PATENTS

| Number | Name | Date |
|---|---|---|
| 1,365,347 | Schneider | Jan. 11, 1921 |
| 1,830,636 | Bragg et al. | Nov. 3, 1931 |
| 1,934,719 | Knox et al. | Nov. 14, 1933 |
| 1,957,759 | Coates | May 8, 1934 |
| 2,244,850 | Orshansky, Jr. | June 10, 1941 |
| 2,450,126 | Fisher | Sept. 28, 1948 |
| 2,472,547 | Purcell | June 7, 1949 |
| 2,475,105 | Mitton | July 5, 1949 |
| 2,507,674 | Mogk | May 16, 1950 |